US008818056B2

(12) United States Patent
Zhou et al.

(10) Patent No.: US 8,818,056 B2
(45) Date of Patent: Aug. 26, 2014

(54) METHOD AND DEVICE FOR ACQUIRING LATENT FINGERPRINT ORIENTATION (71) Applicant: Tsinghua University, Beijing (CN)

(72) Inventors: Jie Zhou, Beijing (CN); Fanglin Chen, Beijing (CN); Lu Xia, Beijing (CN)

(73) Assignee: Tsinghua University, Beijing (CN)

( * ) Notice: Subject to any disclaimer, the term of this patent is extended or adjusted under 35 U.S.C. 154(b) by 69 days.

(21) Appl. No.: 13/681,001

(22) Filed: Nov. 19, 2012

(65) Prior Publication Data
US 2013/0077836 A1 Mar. 28, 2013

Related U.S. Application Data (63) Continuation of application No. PCT/CN2010/080503, filed on Dec. 30, 2010.

(30) Foreign Application Priority Data

May 18, 2010 (CN) .......................... 2010 1 0177404

(51) Int. Cl.
G06K 9/00 (2006.01)
(52) U.S. Cl.
USPC ........................................................ 382/125
(58) Field of Classification Search
None
See application file for complete search history.

(56) References Cited

U.S. PATENT DOCUMENTS

2006/0159316 A1  7/2006  Chisamore et al.
2010/0080425 A1  4/2010  Bebis et al.
2013/0077836 A1  3/2013  Zhou et al.

FOREIGN PATENT DOCUMENTS

CN          101122950 A       2/2008
CN          101853382 A      10/2010

OTHER PUBLICATIONS

International Search Report and Written Opinion dated Apr. 7, 2011 for corresponding International Application No. PCT/CN2010/080503, filed Dec. 30, 2010.
International Preliminary Report on Patentability and Written Opinion dated Nov. 20, 2012 for corresponding International Application No. PCT/CN2010/080503, filed Dec. 30, 2010.

Primary Examiner — Thomas Conway
(74) Attorney, Agent, or Firm — David D. Brush; Westman, Champlin & Koehler, P.A.

(57) ABSTRACT

A method and device for acquiring latent fingerprint orientation. The method includes: extracting a valid area in a latent fingerprint image; acquiring an orientation field of the valid area and a confidence of coordinate points in the valid area; dividing the orientation field into a first area with a high confidence and a second area with a low confidence; collecting control points in the first area, performing triangulation on control points in the first area and determining differences between control points to determine a set of control points; manually marking control points in the second area, adding control points marked to the set, performing triangulation on control points in the set and determining whether a new manually marked control point is to be added in the set according to a difference determination; and establishing a model for control points in the set to obtain an orientation field of the image.

19 Claims, 3 Drawing Sheets

METHOD AND DEVICE FOR ACQUIRING LATENT FINGERPRINT ORIENTATION

CROSS-REFERENCE TO RELATED APPLICATION

The present application is a continuation of and claims priority of PCT/CN2010/080503, filed Dec. 30, 2010, which claims priority of Chinese Application CN 201010177404.X, filed May 18, 2010, the contents of which are hereby incorporated by reference in their entireties.

FIELD

The present disclosure relates to the field of fingerprint recognition, and more particularly to a method and a device for acquiring latent fingerprint orientation.

BACKGROUND

Currently, fingerprint recognition has a broad application, such as applications in a criminal investigation or in fingerprint password recognitions. In an actual fingerprint recognition application, a latent fingerprint may need to be compared. For example, in the criminal investigation, a possible suspect may be identified effectively by recognizing the fingerprint extracted in the criminal field. The latent fingerprint refers to a fingerprint left in the criminal field, i.e., a fingerprint trace left by contacting an object.

In an actual application, the fingerprint recognition method is mainly based on a comparison of minutiae, that is to say, the minutiae are extracted to represent a fingerprint image. The comparison typically comprises two main procedures, which are processing procedure and comparing procedure. The processing procedure may, for example, include a valid area estimation, an orientation field estimation, a ridge extraction, a ridge thinning and a minutiae extraction, in which the orientation field estimation is a key step in the method of minutiae comparison. The comparing procedure may for example include minutiae match and minutiae comparison.

However, since most of the fingerprints in the field are distorted or overlapped fingerprints, a quality of the extracted fingerprints may be undesirable. Although traditional fingerprint processing algorithms have a good performance in processing fingerprints extracted professionally, they are comparatively incapable in processing the latent fingerprints extracted.

SUMMARY

Therefore, the present disclosure needs to provide a method for acquiring latent fingerprint orientation to solve a problem of undesirable result of extracting the latent fingerprint and to effectively improve the quality of extracting the latent fingerprint.

A technical problem to be solved by the present disclosure is to provide a method and a device for acquiring latent fingerprint orientation to improve the quality of the latent fingerprint extracted, which may facilitate a case investigation and may greatly reduce time and efforts of staff devoted in criminal investigation.

In order to solve at least one of the above problems, the present disclosure provides a method for acquiring latent fingerprint orientation, which comprises steps of: A: extracting a valid area in a latent fingerprint image; B: acquiring an orientation field of the valid area and a confidence of each coordinate point in the valid area; C: dividing the orientation field of the valid area into at least one first area with a high confidence and at least one second area with a low confidence by comparing the confidence of each coordinate point with a predefined confidence threshold; D: collecting control points in the at least one first area, performing triangulation to the control points collected in the at least one first area and determining differences between the control points to determine a set of control points; E: manually marking the control points in the at least one second area, adding the control points marked to the set, performing triangulation on all control points in the set and determining whether a new manually marked control point is to be added in the set according to a difference determination; and F: establishing a model for the control points in the set to obtain an orientation field of the latent fingerprint image.

According to an embodiment of the present disclosure, the step B comprises: B1: setting the orientation field of the valid area as a matrix O(m, n) and calculating an orientation O(x, y) of a coordinate point (x, y), in which each element in O(m, n) represents an angle of an orientation of a ridge in the fingerprint image at a coordinate point (m, n), $$O(x, y) = \frac{1}{2}\arctan\frac{\sum_{\Gamma} 2G_x G_y}{\sum_{\Gamma}(G_x^2 - G_y^2)} + \frac{\pi}{2}$$

in which $\Gamma$ represents a N×N square centered at the coordinate point (x, y), (Gx, Gy) is a gradient component of horizontal and vertical coordinates of each coordinate point in a neighboring $\Gamma$, a range of arc tan(•) is $[-\pi, \pi]$, and a range of O(x, y) is $[0°, 180°]$; and B2: calculating a confidence w(x, y) of the coordinate point (x, y) according to the to following formula:

$$w(x, y) = \frac{\left(\sum_{\Gamma}(G_x^2 - G_y^2)\right)^2 + 4\left(\sum_{\Gamma}G_x G_y\right)^2}{\left(\sum_{\Gamma}(G_x^2 + G_y^2)\right)^2}$$

in which $\Gamma$ represents a N×N square centered at the coordinate point (x, y) (Gx, Gy) is a gradient component of horizontal and vertical coordinates of each coordinate point in a neighboring $\Gamma$, and a range of w(x, y) is [0,1].

According to an embodiment of the present disclosure, the step D comprises: D1: collecting the control points in the at least one first area according to a predefined interval; D2: performing the triangulation for the orientation field according to all the control points in the set so as to form triangles with the control points as vertexes; D3: traversing all triangles that are completely within the at least one first area, and obtaining centers of all the triangles that are completely within the at least one first area; D4: obtaining estimated values of orientations of the centers respectively, and determining whether to add a new control point according to a difference between the orientation of the center and orientations of vertexes of a corresponding triangle to the center that is completely within the at least one first area; and D5: if determining to add a new control point, adding the center as a new control point to the set, and performing the triangulation for the set with the new control point added based on the steps D2-D5 until no further control point is to be added.

According to an embodiment of the present disclosure, the step D2 comprises: D21: determining an envelope of all the control points; D22: connecting control points on the envelope to form a plurality of first type triangles with the control points on the envelope as vertexes; D23: inserting control points within the envelope sequentially in a plurality of first type triangles to form a plurality of second type triangles; and D24: optimizing the plurality of the second type triangles.

According to an embodiment of the present invention, the step D23 comprises: determining part of first type triangles among the plurality of first type triangles whose circumcircles contain inserted control points; deleting common edges between the part of first type triangles, and forming a plurality of third type triangles by connecting the inserted control points with all the vertexes of the plurality of first type triangles.

According to an embodiment of the present disclosure, the step E comprises: E1: manually marking the control points in the at least one second area; E2: adding the manually marked control points to the set obtained in step D so as to perform the triangulation on all the control points in the set; E3: obtaining a center of a triangle including a manually marked control point and calculating a difference between an orientation of the center and an orientation of a vertex of the triangle; and E4: determining whether the difference is larger than a second predefined threshold and if yes, continuing to manually mark control points in the triangle and repeating the triangulation and determining whether to add a new manually marked control point in the set until no further control point is to be added, and if no, stop manually adding any control point in the triangle.

According to an embodiment of the present disclosure, the step E further comprises: calculating a minimum distance between points of the latent fingerprint image not covered by a triangle after the triangulation and an outmost envelope, and determining whether the minimum distance is larger than a third predefined threshold: if yes, manually marking a control point in a third area constituted by the points and repeating the triangulation and determining whether to add a new manually marked control point in the third area until no further control point is to be added; and if no, stop manually adding any control point in the third area and all the manually marked control points are added to the set of control points.

According to an embodiment of the present disclosure, the step A comprises: selecting an area covered by a minimum envelope covering all the control points in the set as the valid area.

According to an embodiment of the present disclosure, the step F comprises: establishing a model for the control points in the set and obtaining model parameters; and obtaining the orientation field of the latent fingerprint according to the model parameters.

According to an embodiment of the present disclosure, the model is:

$$U(x, y) = \cos 2\theta(x, y) + i \sin 2\theta(x, y)$$
$$= RE(x, y) + i IM(x, y)$$

where $\theta(x, y)$ and $U(x, y)$ and are orientation function and transform function at $(x, y)$ respectively and $RE(x, y)$ and $IM(x, y)$ represent a real part and an imaginary part of $U(x, y)$ respectively.

$RE(x, y)$ and $IM(x, y)$ are obtained according to $PR(x, y)$ and $PI(x, y)$ respectively, in which $$PR(x,y) = X^T \cdot P_1 \cdot y$$

$$PI(x,y) = X^T \cdot P_2 \cdot y$$

in which, $X=(1, x, x^2, \ldots, x^M)$, $y=(1, y, y^2, \ldots, y^M)$ and M is an order of a polynomial.

According to an embodiment of the present disclosure, the model parameters are $P_1^*$ and $P_2^*$, which are obtained according to:

$$(P_1^*, P_2^*) = \arg\min_{P_1, P_2}$$
$$= \sum_{(x,y) \in S} \left[ \begin{array}{l} (PR(x, y, P_1) - \cos 2\theta_0(x, y))^2 + \\ (PI(x, y, P_2) - \sin 2\theta_0(x, y))^2 \end{array} \right]$$

in which $\theta_0$ is an orientation of the control point $(x, y)$ $\theta_0 = O(x, y)$ and S is the set of control points.

According to an aspect of the present disclosure, a device for acquiring latent fingerprint orientation, comprising: an extracting module, configured to extract a valid area in a fingerprint image; an acquiring module, configured to acquire an orientation field of the valid area and a confidence of each coordinate point in the valid area; a determining module, configured to divide the orientation field of the valid area into a first area with a high confidence and a second area with a low confidence according to the confidence of each coordinate point and according to a predefined confidence threshold; a first processing module, configured to collect control points in the first area, perform triangulation on the control points collected in the first area and determine differences between the control points to determine a set of control points; a second processing module, configured to receive control points manually marked in the second area, add the control points marked to the set, perform a triangulation on all control points in the set and determine whether a new manually marked control point is to be added in the set according to a difference determination; and an orientation field obtaining module, configured to establish a model for control points in the set of control points to obtain an orientation field of the latent fingerprint image.

According to an embodiment of the present disclosure, the acquiring module comprises: an orientation field calculating module, configured to set the orientation field of the valid area to a matrix $O(m, n)$ and to calculate an orientation of a coordinate point $(x, y)$, wherein each element in the matrix $O(m, n)$ represents an angle of a ridge orientation in the fingerprint image at a coordinate point $(m, n)$, $$O(x, y) = \frac{1}{2} \arctan \frac{\sum_\Gamma 2 G_x G_y}{\sum_\Gamma (G_x^2 - G_y^2)} + \frac{\pi}{2}$$

in which $\Gamma$ represents a N×N square centered at the coordinate point $(x, y)$ $(G_x, G_y)$ is a gradient component of horizontal and vertical coordinates of each coordinate point in a neighboring $\Gamma$, a range of $\arctan(\bullet)$ is $[-\pi, \pi]$, and a range of $O(x, y)$ is $[0°, 180°]$; and a confidence calculating module, configured to calculate a confidence $w(x, y)$ of the coordinate point $(x, y)$ according to the following formula:

$$w(x, y) = \frac{\left(\sum_\Gamma (G_x^2 - G_y^2)\right)^2 + 4\left(\sum_\Gamma G_x G_y\right)^2}{\left(\sum_\Gamma (G_x^2 + G_y^2)\right)^2}$$

in which Γ represents a N×N square centered at the coordinate point (x, y) (Gx, Gy) is a gradient component of horizontal and vertical coordinates of each coordinate point in a neighboring Γ, and a range of w(x, y) is [0,1].

According to an embodiment of the present invention, the first processing module comprises: a control point collecting sub-module, configured to collect the control points in the first area according to a predefined interval; a first triangulation sub-module, configured to perform the triangulation for the orientation field according to the all control points in the set so as to form triangles with the control points as vertexes; a center obtaining sub-module, configured to traverse all triangles completely within the first area, and to obtain centers of all the triangles; a first control point adding sub-module, configured to obtain estimated values of orientations of the centers respectively, and to determine whether to add a new control point according to a difference between an orientation of the center and orientations of vertexes of a corresponding triangle to the center that is completely within the first area, and when determining a new control point is to be added, to add the center as a new control to point to the set, and to perform the triangulation for the set with the new control point added until no further control point is to be added.

According to an embodiment of the present disclosure, the first triangulation sub-module is configured to: determine an envelope of all the control points; connect control points on the envelope to form a plurality of first type triangles with the control points on the envelope as vertexes; insert control points within the envelope sequentially in the plurality of first type triangles to form a plurality of second type triangles; and optimize the plurality of the second type triangles.

According to an embodiment of the present disclosure, the second processing module comprises: a recording module, configured to record a manually marked control point in the second area; a second triangulation module, configured to add the manually marked control point to the set of control points so as to perform the triangulation on all the control points in the set; a difference obtaining module, configured to obtain a center of a triangle including a manually marked control point and to calculate a difference between an orientation of the center and an orientation of a vertex of the triangle; and a second control point adding sub-module, configured to determine whether the difference is larger than a second predefined threshold and if yes, to continue to receive manually marked control points in the triangle and to repeat the triangulation and to determine whether to add a new manually marked control point in the set until no further control point is to be added, and if no, no further control point will be manually marked in the triangle.

According to an embodiment of the present disclosure, the device further comprises: a third control point adding module, configured to calculate a minimum distance between points of the latent fingerprint image not covered by a triangle after the triangulation and an outmost envelope, and to determine whether the minimum distance is larger than a third predefined threshold: if yes, receive manually marked control points in a third area constituted by the points and repeating the triangulation and determining whether to receive a new manually marked control point in the third area until no further control point is to be added; and if no, no further control point will be manually marked in the third area and all the existing manually marked control points are added to the set of control points.

According to an embodiment of the present disclosure, the orientation field obtaining to module establishes the model according to:

$$U(x, y) = \cos 2\theta(x, y) + i \sin 2\theta(x, y)$$
$$= RE(x, y) + i IM(x, y)$$

where θ(x, y) and U(x, y) are orientation function and transform function at (x, y) respectively and RE(x, y) and IM(x, y) represent a real part and an imaginary part of U(x, y) respectively, RE(x, y) and IM (x, y) are obtained according to PR(x, y) and PI(x, y) respectively, in which $$PR(x,y)=X^T \cdot P_1 \cdot y$$
$$PI(x,y)=X^T \cdot P_2 \cdot y$$

where $X=(1, x, x^2, \ldots, x^M)$, $y=(1, y, y^2, \ldots, y^M)$ and M is an order of a polynomial.

According to an embodiment of the present disclosure, the model parameters are $P_1^*$ and $P_2^*$, which are obtained according to:

$$(P_1^*, P_2^*) = \arg\min_{P1,P2} \sum_{(x,y)\in S} \left[ \begin{array}{l} (PR(x, y, P_1) - \cos 2\theta_0(x, y))^2 + \\ (PI(x, y, P_2) - \sin 2\theta_0(x, y))^2 \end{array} \right]$$

in which $\theta_0$ is an orientation of the control point (x, y), $\theta_0 = O(x, y)$ and S is the set of control points.

According to the present disclosure, the set of control points is obtained by dividing the orientation field of the valid area of the fingerprint image into the area with the high confidence and the area with the low confident, automatically obtaining the control points in the area with the high confidence and manually adding control points in the area with the low confidence and the orientation field of the latent fingerprint image may be obtained by establishing the model for control points in the set. During this procedure, the obtained orientation field has a capability of resisting noise by adding the control points in an interactive mode and by integrating an automatic processing with human intelligence and flexibility, which may establish a necessary foundation for subsequent fingerprint comparisons. In addition, the method and device of the present disclosure solves the problem of obtaining the orientation field for the poor-quality latent fingerprint image, so as to facilitate applications needing fingerprint analysis such as case investigation etc.

Additional aspects and advantages of the embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Embodiments of the present disclosure will be described in detail in the following descriptions, examples of which are shown in the accompanied drawings, in which the same or similar elements and the elements having same or similar functions are denoted by like reference numerals throughout the descriptions. The embodiments described herein with reference to the accompany drawings are explanatory and illustrative, which are used to generally understand the present disclosure. The embodiments shall not be construed to limit the present disclosure.

With developments of fingerprint recognition technology, its applications grow rapidly. For example, the fingerprint recognition may provide a lot of help to investigations of criminal cases. Therefore, with a fast and effective method for acquiring latent fingerprint orientation, the obtained orientation field of latent fingerprint image may have an improved quality to facilitate applications needing fingerprint recognition, such as the investigation of criminal cases.

Accordingly, the inventors of the present disclosure creatively propose a method for acquiring latent fingerprint orientation. A part of the image including the fingerprint is extracted and a valid area in a fingerprint image is obtained; an orientation field and a confidence of the valid area are acquired; it is determined whether the acquired confidence is larger than a predefined confidence threshold: if yes, the valid area is marked as an area with a high confidence and if no, the valid area is marked as an area with a low confidence; control points in the area with the high confidence in the orientation field of the valid area are collected, and triangulation is performed on the control points collected in the area with the high confidence, and differences between the control points are determined to determine a set of control points. On the other hand, the control points in the area with the low confidence in the orientation field of the valid area are manually marked, then the control points manually marked are added to the set, the triangulation is performed on all the control points in the set and it is determined whether a new manually marked control point is to be added in the set according to a difference determination; and a model for the control points in the set is established to obtain an image of the latent fingerprint orientation.

Figure 1:
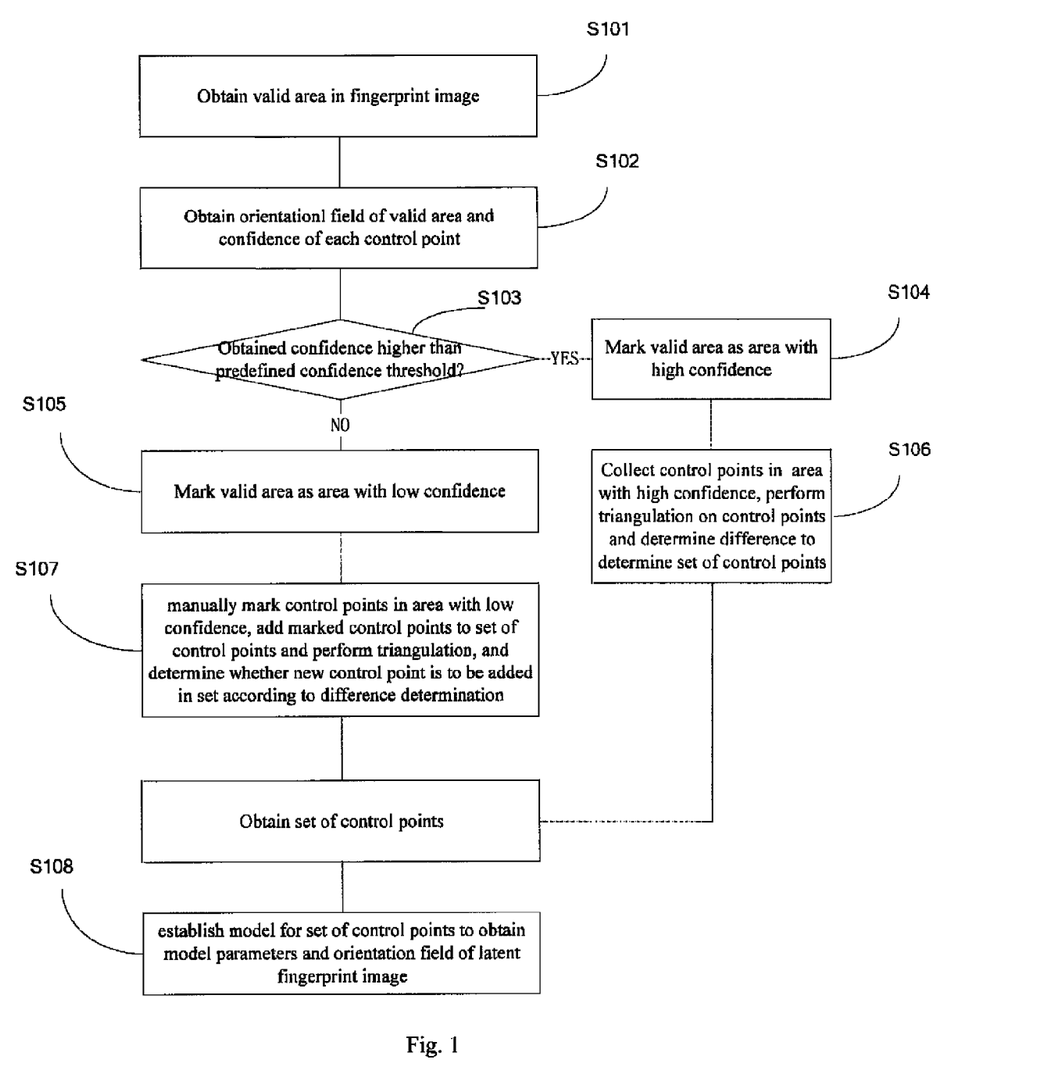
FIG. 1 is a flow chart showing a method of acquiring latent fingerprint orientation according to an embodiment of the present disclosure.

The method for acquiring the latent fingerprint orientation according to the present disclosure will be illustrated in detail with reference to the accompanied drawings, in which FIG. 1 is a flow chart showing the method for acquiring the latent fingerprint orientation according to an embodiment of the present disclosure.

According to the embodiment of the present disclosure, the method for acquiring the latent fingerprint orientation may comprise steps of: A: extracting a valid area in a latent fingerprint image; B: acquiring an orientation field of the valid area and a confidence of each coordinate point in the valid area; C: dividing the orientation field of the valid area into at least one first area with a high confidence and at least one second area with a low confidence by comparing the confidence of each coordinate point with a predefined confidence threshold; D: collecting control points in the at least one first area, performing triangulation to the control points collected in the at least one first area and determining differences between the control points to determine a set of control points; E: manually marking the control points in the at least one second area, adding the control points marked to the set, performing triangulation on all control points in the set and determining whether a new manually marked control point is to be added in the set according to a difference determination; and F: establishing a model for the control points in the set to obtain an orientation field of the latent fingerprint image.

Thus, according to the above method, the obtained orientation field of the latent fingerprint image may be guaranteed to have a capability of resisting noise by adding the control points in an interactive mode and by integrating automatic processing with human intelligence and flexibility. In addition, the problem of obtaining the orientation field from the latent fingerprint image with poor quality may be solved.

The steps in the above methods will be described in detail with reference to the flow chart shown in FIG. 1. As shown in FIG. 1, the method includes the following steps.

S101: extracting a part of the image including the fingerprint and obtaining the valid area of the fingerprint image The extracted part of the image including the fingerprint refers to a part of the fingerprint image including a ridge, which is generally referred to as the valid area of the fingerprint image. Specifically, the fingerprint image is divided into lattices with a size of N×N (for example, 16*16 pixels) respectively and a grey or gray mean and a variance are calculated for each lattice. According to the embodiment of the present disclosure, if the grey mean of the lattice is within a range of [30, 220] and the variance is larger than 5, this lattice is regarded as a valid lattice. A 3*3 frequency domain filtering is performed on each of the above lattice (16*16 pixels) and if within a 3*3 neighboring domain of the lattice (8 neighboring lattices with 16*16 pixels connected with the lattice) only the above lattice is regarded as invalid, this lattice may be corrected as valid. In contrast, if within a 3*3 neighboring domain of the lattice (8 neighboring lattices connected with the lattice) only the above lattice is regarded as valid, this lattice may be corrected as invalid. If the obtained valid area is a multi-connected area, which means that "holes" may exist in the obtained valid area. Thus, positions of the "holes" may be corrected to valid area.

Figure 2:
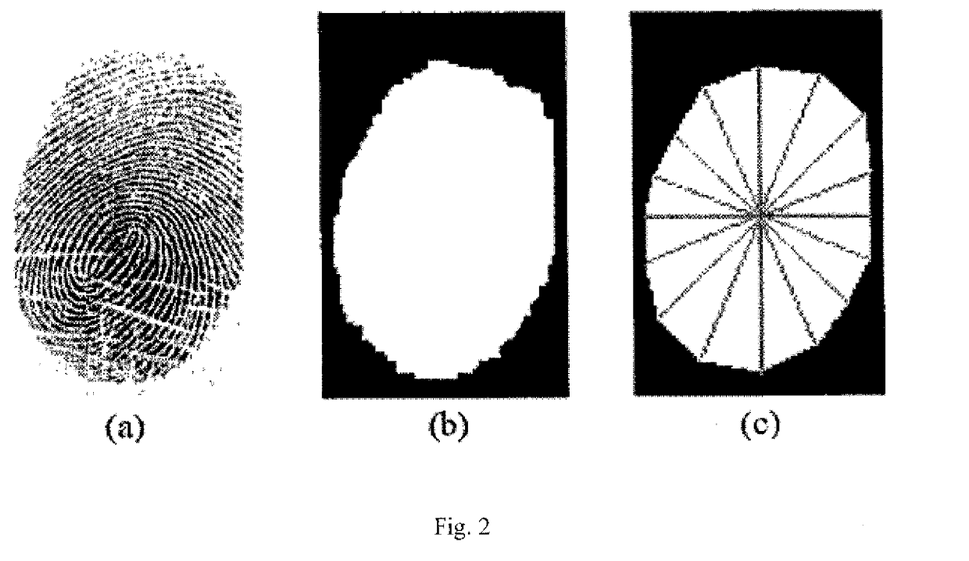
FIG. 2 is a schematic diagram showing a stored valid area of a latent fingerprint image according to an embodiment of the present disclosure.

According to the embodiment of the present disclosure, the valid area is represented by a link model simply constituted by 16 points. First, a center of the valid area calculated in a former step is found, that is, means of x coordinates and y coordinates of points in all the valid areas are calculated. Then, 16 lines are drawn in 16 different angles (0, $\pi/8$, $\pi/4$, $3\pi/8$, $\pi/2$, $5\pi/8$, $3\pi/4$, $7\pi/8$, $\pi$, $9\pi/8$, $5\pi/4$, $11\pi/8$, $3\pi/2$, $13\pi/8$, $7\pi/4$ and $15\pi/8$ respectively) from the calculated center. Intersections of these lines with an edge of the valid area constitute 16 points needed. Thus, the valid area of the fingerprint image is stored by storing data of 32 bytes. FIG. 2 is a schematic diagram showing the stored valid area of the fingerprint image.

S102: obtaining an orientation field of the valid area and a confidence of each point in the valid area The orientation field of the fingerprint image is represented by a matrix O(m, n), in which each element in O(m, n) represents an angle of an orientation of a ridge in the fingerprint image at the coordinate point (m, n). According to the embodiment of the present disclosure, a 4*4 square (including 16 pixel points) may be taken as one coordinate unit, and an orientation of each unit is represented by an orientation at the center of the unit.

Specifically, firstly, the orientation of each coordinate point in the valid area in the fingerprint image is calculated. For example, the orientation O(x, y) of the coordinate point (x, y) is calculated according to the following formula:

$$O(x, y) = \frac{1}{2}\arctan\frac{\sum_\Gamma 2G_x G_y}{\sum_\Gamma (G_x^2 - G_y^2)} + \frac{\pi}{2}.$$

$\Gamma$ represents a 4×4 square centered at the coordinate point (x, y), (Gx, Gy) is a gradient component of horizontal and vertical coordinates of each coordinate point in a neighboring $\Gamma$, a range of arctan(•) is [−π, π] and a range of O(x, y) is [0, π].

Secondly, the confidence of each coordinate is calculated. For example, the confidence w(x, y) of the coordinate (x, y) is calculated according to the following formula:

$$w(x, y) = \frac{\left(\sum_\Gamma (G_x^2 - G_y^2)\right)^2 + 4\left(\sum_\Gamma G_x G_y\right)^2}{\left(\sum_\Gamma (G_x^2 + G_y^2)\right)^2}.$$

$\Gamma$ represents a N×N square centered at the coordinate point (x, y) is a gradient component of horizontal and vertical coordinates of each coordinate point in a neighboring $\Gamma$, and a range of w(x, y) is [0,1]. The larger w(x, y) is, the higher the confidence is and the more reliable the orientation is.

S103: determining whether the acquired confidence is larger than a predefined confidence threshold If yes, S104 is performed, which means this area is marked as the area with the high confidence; if no, S105 is performed, which means this area is marked as the area with the low confidence.

According to the embodiment of the present disclosure, based on the orientation field and the confidence matrix acquired in S102, the confidence threshold is set as $w_t$=0.25. For the area with the confidence larger than this threshold, this area is marked as the area with the high confidence which may be represented as H. According to the embodiment of the present disclosure, there may be a plurality of areas with the high confidence. For the area with the confidence smaller than this threshold, this area is marked as the area with the low confidence which may be represented as L. According to the embodiment of the present disclosure, there may be a plurality of areas with the low confidence.

S106: collecting control points in the area with the high confidence, performing triangulation on the control points and determining a difference to determine a set of control points According to the embodiment of the present disclosure, S106 may include the following sub-steps.

S11, collecting the control points in the area with the high confidence according to a predefined interval Δ;

According to the embodiment of the present disclosure, the predefined interval Δ may be 26. In this area with the high confidence, each point is collected as a control point every this predefined interval Δ. The control point may include position information and angle information. Then the triangulation is performed according to the obtained control points, which means the orientation field is divided into multiple triangle areas which are not overlapped with each other, and the control points are at vertexes of respective triangles. According to the embodiment of the present disclosure, for example, a computing unit may be utilized to automatically collect the control points.

S12, determining an envelope of all the control points, connecting the control points on the envelop to form triangles with the control points on the envelope as vertexes;

The envelope including all the control points is obtained, which means that an enclosed area constituted by connecting outmost control points is obtained. Control points on the envelope are linearly connected so that areas within the envelope are classified into multiple triangles which are not overlapped with each other. And the multiple triangles have vertexes on the envelope which are the control points.

S13, inserting control points within the envelope sequentially, deleting common edges between triangles containing the control points and optimizing newly formed triangles;

Specifically, the control points within the envelope are inserted sequentially. Among the current triangles, the triangles whose circumcircles include the inserted control points are picked up and common edge of these triangles are deleted. The inserted control points are connected with all the vertexes of these triangles, and the locally newly formed triangles are optimized: two triangles with a common edge are combined into one polygon; a minimum circumcircle of the polygon is made; it is determined whether a fourth vertex is within the circumcircle; if yes, a diagonal is modified, which means the diagonals are interchanged, and local optimization is finished; and if no, no optimization is needed. The above step is repeated until all the control points are inserted.

S14, traversing all triangles completely within the area with the high confidence, determining its center and calculating a difference between an orientation of the center and orientations of vertexes of a corresponding triangle;

All the triangles completely within the area H (referred to as $\Delta M_1 M_2 M_3$) are traversed and $P(x_p, y_p)$ is taken as the center of the triangle $\Delta M_1 M_2 M_3$ $$x_p = \frac{1}{3}(x_1 + x_2 + x_3)$$

$$y_p = \frac{1}{3}(y_1 + y_2 + y_3)$$

in which $x_1$, $x_2$, $x_3$ are abscissas of the triangle $\Delta M_1 M_2 M_3$ respectively and $y_1$, $y_2$, $y_3$ are ordinates of the triangle $\Delta M_1 M_2 M_3$ respectively.

In the original orientation field and around the calculated $P(x_p, y_p)$, a pixel $P_n$ whose Euclidean distance to $P(x_p, y_p)$ is minimum is taken and the orientation of $P_n$ is regarded as an orientation estimation of $P(x_p, y_p)$.

Then, the difference ΔD between the orientation $\vec{\theta}_p$ of the triangle center $P(x_p, y_p)$ and the orientation of the triangle $\Delta M_1 M_2 M_3$ vertex is calculated:

$$\Delta D = \sum_{i=1}^{3} (\hat{\theta}_p - \theta_i)^2.$$

S15, determining whether the calculated ΔD is larger than a first predefined threshold ΔD0 and if yes, performing S16, in which new control points within the triangle are collected and repeating optimization and determination until no new control point is to be collected; if no, performing S17, in which no new control point is collected in the triangle.

According to the embodiment of the present disclosure, assuming the first predefined threshold ΔD0 is 1800 and the calculated difference ΔD is larger than the first predefined threshold ΔD0, new control points should be collected in this triangle and $P(x_p, y_p)$ is added as a new control point; if the difference ΔD is smaller than the first predefined threshold ΔD0, no new control points is to be collected in this triangle.

Triangulation is repeated for the set with the newly collected control points and optimization and determination are also repeated until no new control point is to be collected.

S18, determining the set of control points.

The control points collected in the above step is determined as the set of control points desired.

It should be noted that in the area H with the high confidence marked in steps S104 and S105, no control point needs to be manually marked while in the area L with the low confidence, the control points needs to be manually marked.

S107, manually marking control points in the area L with the low confidence in the orientation field, adding the marked control points to the set of control points and performing triangulation, and determining whether a new control point is to be added in the set according to a difference determination;

According to the embodiment of the present disclosure, S107 includes the following sub-steps.

S21, manually marking the control points in the area L with the low confidence;

a control point is manually marked where a ridge is distinguishable within the area L with the low confidence. The marked control point is valid information point assisting to recover the orientation field. Preferably, the control point includes position and angle information. In the present disclosure, the manually marked control point is recorded as PH.

S22, adding the manually marked control point to the set of control points so as to perform the triangulation;

The manually marked control point PH is added to the set of control points. Similarly, the triangulation here may be performed in a same way as described above.

S23, obtaining a center of a triangle including a manually marked control point;

For the triangle with PH as the vertex after triangulation, $P(x_p, x_p)$ is taken as the center of the triangle $\Delta M_1 M_2 M_3$, $$x_p = \frac{1}{3}(x_1 + x_2 + x_3),$$

$$y_p = \frac{1}{3}(y_1 + y_2 + y_3),$$

in which $x_1, x_2, x_3$ are abscissas of the triangle $\Delta M_1 M_2 M_3$ respectively and $y_1, y_2, y_3$ are ordinates of the triangle $\Delta M_1 M_2 M_3$ respectively.

S24, calculating the difference between the center orientation and the triangle vertex orientation;

Specifically, the orientation of $P(x_p, y_p)$ is obtained by interpolation and then the range of the orientation of the triangle vertex is transformed:

$$\theta'_i = \begin{cases} \theta_i, & 0 \le \theta_i < \pi, \\ 2\pi - \theta_i, & \pi \le \theta_i < 2\pi, \end{cases}$$

The orientation of the triangle vertex is transformed:

$$\begin{cases} \theta''_1 = \begin{cases} \theta'_1 + \pi, & \text{when } \theta'_2 > \frac{\pi}{2} \text{ and } \theta'_3 - \theta'_1 > \frac{\pi}{2}, \\ \theta'_1, & \text{etc.} \end{cases} \\ \theta''_2 = \theta'_2, \\ \theta''_3 = \begin{cases} \theta'_3 - \pi, & \text{when } \theta'_2 < \frac{\pi}{2} \text{ and } \theta'_3 - \theta'_1 > \frac{\pi}{2}, \\ \theta'_3, & \text{etc,} \end{cases} \end{cases}$$

The orientation of an imaginary control point is calculated:

$$\theta'_p = \frac{1}{3}(\theta''_1 + \theta''_2 + \theta''_3),$$

The orientation of the calculated control point is transformed:

$$\hat{\theta}_p = \begin{cases} \pi + \theta'_p, & -\frac{\pi}{2} < \theta'_p < 0 \\ \theta'_p, & 0 < \theta'_p < \pi \\ \pi - \theta'_p, & \pi < \theta'_p < \frac{3\pi}{2} \end{cases}$$

and the orientation of point P is $\hat{\theta}_p$.

The difference $\Delta D$ between the orientation of the center and the orientation of the triangle vertexes is calculated:

$$\Delta D = \sum_{i=1}^{3} (\hat{\theta}_p - \theta_i)^2, .$$

S25, determining whether the difference $\Delta D$ is larger than a second predefined threshold and if yes, performing S26, in which control points are manually marked in the triangle continually, and repeating optimization and determination until no new control point is needed to be manually marked; if no, performing S27, in which no new control point is to is be manually marked in the triangle;

A threshold $\Delta D_0$ is set to be a second predefined threshold and if the calculated difference $\Delta D$ is larger than the second predefined threshold $\Delta D_0$, it is prompted that a control point needs to be marked in the triangle and then a control point needs to be manually marked in the triangle continually. After the control point is marked, the control point is added in the set of control points and the triangulation and orientation difference determination are performed until no new control point needs to be manually marked. If the orientation difference $\Delta D$ is smaller than the second predefined threshold $\Delta D_0$, no new control point will be manually marked in the triangle.

S28, calculating a minimum distance of points of the latent fingerprint image not covered by any triangle after the triangulation with an outmost envelope and determining whether the distance is larger than a third predefined threshold;

If the distance is larger than the third predefined threshold, S29 will be performed, in which a control point is manually marked in the area including this points and the triangulation and orientation difference determination are performed on the manually marked control point (in the same way as the above step) until no control point is to be manually marked. If the distance is not larger than the third predefined threshold, S210 will be performed, in which no control point is to be manually marked in the area including this control point.

The area not covered by the triangle after triangulation is recorded as an area N. Every control point in the area N is traversed and a minimum distance n_d between each control point and the envelope constituted by outmost edges of all the triangles after the triangulation is calculated.

$\delta$=20 pixels may be set as a third predefined threshold. If n_d>$\delta$, a control point is manually marked in the area including this control point and the triangulation and orientation difference determination are performed on the manually marked control point until no control point is to be manually marked. If n_d<δ, no control point is to be manually marked in the area including this control point. All the manually marked control points will be added to the set of control points.

S108: establishing a model for the set of control points to obtain an orientation field of the latent fingerprint image According to the embodiment of the present disclosure, S108 may include the following sub-steps.

S31, selecting a minimum envelope which can cover all the control points in the set;

S32, establishing a model for the control points in the set;

θ(x, y) and U(x, y) are defined as orientation function and transform function at the coordinate point (x, y) respectively and a unit vector U(x, y) may be represented by the orientation value θ(x, y), $$U(x, y) = \cos 2\theta(x, y) + i\sin 2\theta(x, y)$$
$$= RE(x, y) + iIM(x, y)$$

in which RE(x, y) and IM(x, y) represent a real part and an imaginary part of U(x, y) respectively.

In order to obtain RE(x, y) and IM(x, y), two polynomials with two variables are established respectively, i.e. PR(x, y) and PI(x, y). The two polynomials may be calculated as follows:

$$PR(x,y) = X^T \cdot P_1 \cdot Y,$$

and $$PI(x,y) = X^T \cdot P_2 \cdot Y$$

in which $X = (1, x, x^2, \ldots, x^M)$, $Y = (1, y, y^2, \ldots, y^M)$

In the above two formulae, M is an order of a polynomial. $P_1$ and $P_2$ both have $(M+1) \times (M+1)$ parameters to be estimated. The procedure of estimating parameters is a fit procedure, which includes finding the optimal $P_1$ and $P_2$ to make an error between the is restored orientation field and the original orientation field smallest.

According to the embodiment of the present disclosure, the order may be chosen as M=4, which may satisfy the fit accuracy and at the same time may achieve comparatively excellent fit effect and with comparatively small amount of calculation.

S33, obtaining model parameters $P_1^*$ and $P_2^*$;

$$(P_1^*, P_2^*) = \arg\min_{P_1, P_2} \sum_{(x,y) \in S} \left[ \begin{array}{l} (PR(x, y, P_1) - \cos 2\theta_0(x, y))^2 + \\ (PI(x, y, P_2) - \sin 2\theta_0(x, y))^2 \end{array} \right],$$

in which $\theta_0$ the orientation of the control point (x, y), i.e. $\theta_0 = O(x, y)$, and S is the obtained set of control points.

S34, obtaining the finally desired orientation field with the parameters $P_1^*$ and $P_2^*$.

For the orientation θ(x, y) at each coordinate point (x, y), coordinate values x, y and values of $P_1^*$ and $P_2^*$ are substituted in $PR(x, y) = X^T \cdot P_1 \cdot Y$ and $PI(x, y) = X^T \cdot P_2 \cdot Y$, in which $X = (1, x, x^2, \ldots, x^M)$, $Y = (1, y, y^2, \ldots, y^M)$, then PR(x, y) and PI(x, y) are solved, which means RE(x, y) and IM(x, y) are solved.

Then RE(x, y) and IM(x, y) are substituted in the following formula:

$$U(x, y) = \cos 2\theta(x, y) + i\sin 2\theta(x, y)$$
$$= RE(x, y) + iIM(x, y)$$

and θ(x, y) are solved so that the orientation field may be obtained.

According to the method for acquiring the latent fingerprint orientation of the present disclosure, the obtained orientation field is guaranteed to have a capability of resisting noise by adding the control points in an interactive mode, integrating automatic processing with human intelligence and flexibility and using the model for the obtained control points, which has established a necessary foundation for subsequent fingerprint comparisons. In addition, the method solves the problem of obtaining the orientation field for the poor-quality latent fingerprint image, so as to facilitate applications needing fingerprint analysis such as criminal case investigation.

A device for acquiring latent fingerprint orientation according to an embodiment of the present disclosure will be described with reference to FIG. 3.

Figure 3:
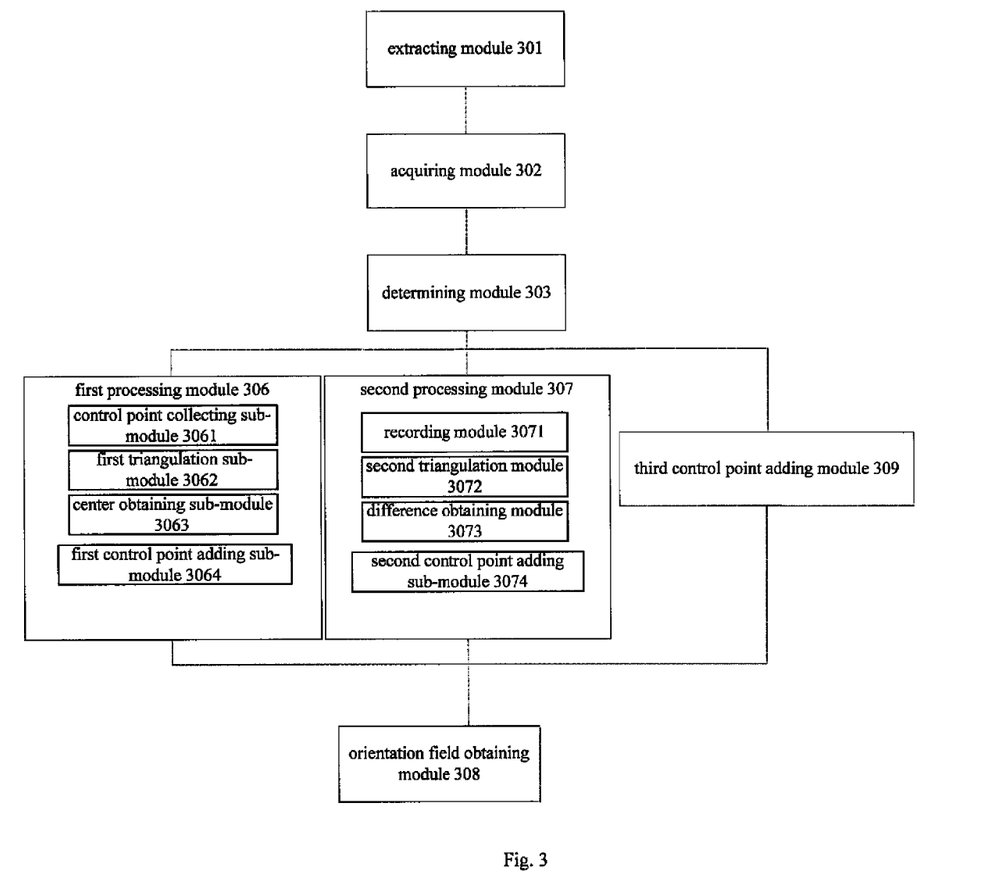
FIG. 3 is a schematic diagram showing a structure of a device for acquiring latent fingerprint orientation according to an embodiment of the present disclosure.

As shown in FIG. 3, the device for acquiring the latent fingerprint orientation includes: an extracting module 301, configured to extract a valid area in a fingerprint image; an acquiring module 302, configured to acquire an orientation field of the valid area and a confidence of each coordinate point in the valid area; a determining module 303, configured to divide the orientation field of the valid area into a first area with a high confidence and a second area with a low confidence according to the confidence of each coordinate point and according to a predefined confidence threshold; a first processing module 306, configured to collect control points in the first area, perform triangulation on the control points collected in the first area and determine differences between the control points to determine a set of control points; a second processing module 307, configured to receive control points manually marked in the second area, add the control points marked to the set, perform a triangulation on all control points in the set and determine whether a new manually marked control point is to be added in the set according to a difference determination; and an orientation field obtaining module 308, configured to establish a model for control points in the set to obtain an orientation field of the latent fingerprint image.

It should be noted that a brief explanation to the modules and composition will be given and technical solutions which are similar to or same with the above method will be simply discussed.

According to the embodiment of the present disclosure, the acquiring module 302 may include: an orientation field calculating module 3021, configured to set the orientation field of the valid area to a matrix O(m, n) and to calculate an orientation O(x, y) of the coordinate point (x, y) according to the following formula, in which each element in O(m, n) represents an angle of a ridge orientation in the fingerprint image at a coordinate point (m, n), $$O(x, y) = \frac{1}{2} \arctan \frac{\sum_\Gamma 2 G_x G_y}{\sum_\Gamma (G_x^2 - G_y^2)} + \frac{\pi}{2}$$

in which Γ represents a N×N square centered at the coordinate point (x, y), (Gx, Gy) is gradient components of horizontal and vertical coordinates of each coordinate point in a neighboring Γ, a range of arctan(•) is [−π, π], and a range of O(x, y) is [0°, 180°]; and a confidence calculating module 3022, configured to calculate a confidence w(x, y) is of the coordinate point (x, y) according to the following formula:

$$w(x, y) = \frac{\left(\sum_\Gamma (G_x^2 - G_y^2)\right)^2 + 4\left(\sum_\Gamma G_x G_y\right)^2}{\left(\sum_\Gamma (G_x^2 + G_y^2)\right)^2}$$

in which Γ represents a N×N square centered at the coordinate point (x, y), (Gx, Gy) is gradient components of horizontal and vertical coordinates of each coordinate point in a neighboring Γ, and a range of w(x, y) is [0,1]. The larger w(x, y) is, the higher the confidence is and the more reliable the orientation is.

The determining module is configured to determine whether the obtained confidence is higher than a predefined confidence threshold and to divide the orientation field of the valid area into the area with the high confidence and the area with the low confidence. According to the embodiment of the present disclosure, the confidence threshold may be set as $w_t$=0.25. For example, for the area with the confidence larger than this threshold, this area is marked as the area with the high confidence which is represented as H. According to the embodiment of the present disclosure, there may be a plurality of areas with the high confidence. For the area with the confidence smaller than this threshold, this area is marked as the area with the low confidence which is represented as L. According to the embodiment of the present disclosure, there may be a plurality of areas with the low confidence.

Further, the first processing module 306 includes: a control point collecting sub-module 3061, configured to collect the control points in the first area according to a predefined interval; a first triangulation sub-module 3062, configured to perform the triangulation for the orientation field according to all the control points in the set so as to form triangles with the control points as vertexes; a center obtaining sub-module 3063, configured to traverse all triangles completely within the first area, and to obtain centers of all the triangles; a first control point adding sub-module 3064, configured to obtain estimated values of orientations of the centers respectively, and to determine whether to add a new control point according to a difference between an orientation of a center and orientations of vertexes of a corresponding triangle to the center that is completely within the first area, and when determining a new control point is to be added, to add the center as a new control point to the set, and to perform the triangulation for the set with the new control point added until no further control point is to be added.

According to the embodiment of the present disclosure, the first triangulation sub-module 3062 is configured to: determine an envelope of all the control points; connect control points on the envelope to form a plurality of first type triangles with the control points on the envelope as vertexes; insert control points within the envelope sequentially in the plurality of first type triangles to form a plurality of second type triangles; and optimize the plurality of the second type triangles.

According to the embodiment of the present disclosure, the second processing module 307 includes: a recording module 3071, configured to record a manually marked control point in the second area; a second triangulation module 3072, configured to add the manually marked control point to the set of control points so as to perform the triangulation on all the control points in the set; a difference obtaining module 3073, configured to obtain a center of a triangle including a manually marked control point and to calculate a difference between an orientation of the center and an orientation of a vertex of the triangle; and a second control point adding sub-module 3074, configured to determine whether the difference is larger than a second predefined threshold and if yes, to continue to manually mark control points in the triangle and to repeat the triangulation and to determine whether to add a new manually marked control point in the set until no further control point is to be added, and if no, no further control point will be manually marked in the triangle.

According to the embodiment of the present disclosure, the device further includes: a third control point adding module 309, configured to calculate a minimum distance between points of the latent fingerprint image not covered by the triangle after the triangulation and an outmost envelope, and to determine whether the minimum distance is larger than a third predefined threshold: if yes, to receive control points manually marked in a third area constituted by the points and repeating the triangulation and determining whether to add a new manually marked control point in the third area until no newly added control point is received; and if no, no further control point will be manually marked in the third area and all the manually marked control points are added to the set of control points.

The area not covered by the triangle after triangulation is recorded as an area N. Every control point in the area N is traversed and a minimum distance n_d between each control point and the envelope constituted by the outmost edges of all the triangles after the triangulation is calculated.

According to the embodiment of the present disclosure, δ=20 pixels may be set as a third predefined threshold. If n_d>δ, the third control point adding module 309 is configured to receive a control point marked in the area including this control point and the triangulation and orientation difference determination are performed on the marked control point until no newly marked control point is received. If n_d<δ, the third control point adding module 309 will not mark control point in the area including this control point.

Thus, with the third control point adding module 309, the set of control points may be further improved so that more fingerprint information may be achieved based on the set of control points and the anti-noise capability of the obtained orientation field may be improved.

According to the embodiment of the present disclosure, the orientation field obtaining module 308 establishes a model according to the following formula to obtain a final orientation field:

$$U(x, y) = \cos 2\theta(x, y) + i\sin 2\theta(x, y)$$
$$= RE(x, y) + iIM(x, y)$$

in which θ(x, y) and U(x, y) are orientation function and transform function at a) point (x, y), respectively and RE(x, y) and IM(x, y) represent a real part and an imaginary part U(x, y) of respectively, and RE(x, y) and IM(x, y) are obtained by PR(x, y) and PI(x, y) as follows:

$$PR(x,y) = X^T \cdot P_1 \cdot y$$

$$PI(x,y) = X^T \cdot P_2 \cdot y$$

where X=(1, x, x$^2$, ..., x$^M$), y=(1, y, y$^2$, ..., y$^M$) and M is an order of a polynomial. In the above formulae, M is an order of a polynomial. $P_1$ and $P_2$ both have $(M+1)\times(M+1)$ parameters to be estimated. The procedure of estimating parameters is a fit procedure, which includes finding the optimal $P_1$ and $P_2$ to make an error between the restored orientation field and the original orientation field smallest. According to an embodiment of the present disclosure, the order may be chosen as M=4, which may satisfy the fit accuracy and at the same time may achieve comparatively excellent fit effect and with comparatively small amount of calculation.

According to an embodiment of the present disclosure, the orientation field obtaining module 308 calculates the orientation field by solving the model parameters $P_1^*$ and $P_2^*$, which are obtained according to:

$$(P_1^*, P_2^*) = \arg\min_{P1,P2} \sum_{(x,y)\in S} \left[ \begin{array}{l} (PR(x, y, P_1) - \cos 2\theta_0(x, y))^2 + \\ (PI(x, y, P_2) - \sin 2\theta_0(x, y))^2 \end{array} \right]$$

where $\theta_0$ is an orientation of the control point (x, y), i.e. $\theta_0 = O(x, y)$ and S is the set of control points.

With the obtained parameters $P_1^*$ and $P_2^*$, the final orientation field may be obtained. For example, for the orientation $\theta(x, y)$ at each coordinate point (x, y), coordinate values x, y and values of $P_1^*$ and $P_2^*$ are substituted in $PR(x, y)=X^T \cdot P_1 \cdot Y$ and $PI(x, y)=X^T \cdot P_2 \cdot Y$, in which $X=(1, x, x^2, \ldots, x^M)$, $y=(1, y, y^2, \ldots, y^M)$, then PR(x, y) and PI(x, y) are solved, which means RE(x, y) and IM(x, y) are solved.

Then RE(x, y) and IM(x, y) are substituted in the following formula:

$$U(x, y) = \cos 2\theta(x, y) + i\sin 2\theta(x, y)$$
$$= RE(x, y) + iIM(x, y)$$

and $\theta(x, y)$ are solved so that the orientation field may be obtained.

According to the present disclosure, the set of control points is obtained by dividing the orientation field of the valid area of the fingerprint image into the area with the high confidence and the area with the low confidence, automatically obtaining the control points in the area with the high confidence and manually adding control points in the area with the low confidence, and the image of the latent fingerprint orientation is obtained by establishing the model for control points in the set. During this procedure, the obtained orientation field has an anti-noise capability by adding the control points in an interactive mode and by integrating automatic processing with human intelligence and flexibility, which has established a necessary foundation for subsequent fingerprint comparisons. In addition, the method and device of the present disclosure solves the problem of obtaining the orientation field for the poor-quality latent fingerprint image, so as to facilitate applications needing fingerprint analysis such as criminal case investigation.

Reference throughout this specification to "an embodiment", "some embodiments", "one embodiment", "an example", "a specific examples", or "some examples" means that a particular feature, structure, material, or characteristic described in connection with the embodiment or example is included in at least one embodiment or example of the disclosure. Thus, the appearances of the phrases such as "in some embodiments", "in one embodiment", "in an embodiment", "an example", "a specific examples", or "some examples" in various places throughout this specification are not necessarily referring to the same embodiment or example of the disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications all falling into the scope of the claims and their equivalents may be made in the embodiments without departing from spirit and principles of the disclosure.

What is claimed is:

1. A method for acquiring latent fingerprint orientation, comprising steps of:
   A: extracting a valid area in a latent fingerprint image;
   B: acquiring an orientation field of the valid area and a confidence of each coordinate point in the valid area;
   C: dividing the orientation field of the valid area into at least one first area with a high confidence and at least one second area with a low confidence by comparing the confidence of each coordinate point with a predefined confidence threshold;
   D: collecting control points in the at least one first area, performing triangulation to the control points collected in the at least one first area and determining differences between the control points to determine a set of control points;
   E: manually marking the control points in the at least one second area, adding the control points marked to the set, performing triangulation on all control points in the set and determining whether a new manually marked control point is to be added in the set according to a difference determination; and
   F: establishing a model for the control points in the set to obtain an orientation field of the latent fingerprint image.

2. The method according to claim 1, wherein the step F comprises:
   establishing a model for the control points in the set and obtaining model parameters; and
   obtaining orientation field of the latent fingerprint image according to the model parameters.

3. The method according to claim 1, wherein the step A comprises:
   selecting an area covered by a minimum envelope covering all the control points in the set as the valid area.

4. The method according to claim 3, wherein the model is:

$$U(x, y) = \cos 2\theta(x, y) + i\sin 2\theta(x, y)$$
$$= RE(x, y) + iIM(x, y)$$

where $\theta(x,y)$ and $U(x,y)$ are orientation function and transform function at (x,y) respectively and RE(x,y) and IM(x,y) represent a real part and an imaginary part of U(x,y) respectively, RE(x,y) and IM(x,y) are obtained according to PR(x,y) and PI(x,y) respectively, wherein $$PR(x,y)=X^T \cdot P_1 \cdot Y$$

$$PI(x,y)=X^T \cdot P_2 \cdot Y$$

wherein, $X=(1, x, x^2, \ldots x^M)$, $Y=(1, y, y^2, \ldots, y^M)$ and M is an order of a polynomial.

5. The method according to claim 4, wherein the model parameters are $P_1^*$ and $P_2^*$, which are obtained according to:

$$(P_1^*, P_2^*) = \arg\min_{P_1, P_2} \sum_{(x,y) \in S} \left[ \begin{array}{l} (PR(x, y, P_1) - \cos2\theta_0(x, y))^2 + \\ (PI(x, y, P_2) - \sin2\theta_0(x, y))^2 \end{array} \right]$$

wherein $\theta_0$ is an orientation of the control point (x,y), $\theta_0 = O(x,y)$ and S is the set of control points.

6. The method according to claim 1, wherein the step B comprises:

B1: setting the orientation field of the valid area as a matrix O(m,n) and calculating an orientation O(x,y) of a coordinate point (x,y), wherein each element in the matrix O(m,n) represents an angle of an orientation of a ridge in the fingerprint image at a coordinate point (m,n), $$O(x, y) = \frac{1}{2} \arctan \frac{\sum_\Gamma 2G_x G_y}{\sum_\Gamma (G_x^2 - G_y^2)} + \frac{\pi}{2}$$

wherein $\Gamma$ represents a N×N square centered at the coordinate point (x,y), (Gx,Gy) is a gradient component of horizontal and vertical coordinates of each coordinate point in a neighboring $\Gamma$, a range of arctan(•) is $[-\pi, \pi]$, and a range of O(x,y) is $[0°, 180°]$; and B2: calculating a confidence w(x,y) of the coordinate point (x,y) according to the following formula:

$$w(x, y) = \frac{\left(\sum_\Gamma (G_x^2 - G_y^2)\right)^2 + 4\left(\sum_\Gamma G_x G_y\right)^2}{\left(\sum_\Gamma (G_x^2 + G_y^2)\right)^2}$$

wherein $\Gamma$ represents a N×N square centered at the coordinate point (x,y), (Gx,Gy) is a gradient component of horizontal and vertical coordinates of each coordinate point in a neighboring $\Gamma$, and a range of w(x,y) is [0,1].

7. The method according to claim 6, wherein the step E comprises:

E1: manually marking the control points in the at least one second area;

E2: adding the manually marked control points to the set obtained in step D so as to perform the triangulation on all the control points in the set;

E3: obtaining a center of a triangle including a manually marked control point and calculating a difference between an orientation of the center and an orientation of a vertex of the triangle; and E4: determining whether the difference is larger than a second predefined threshold and if yes, continuing to manually mark control points in the triangle and repeating the triangulation and determining whether to add a new manually marked control point in the set until no further control point is to be added, and if no, stop manually adding any control point in the triangle.

8. The method according to claim 7, wherein the step E further comprises:

E5: calculating a minimum distance between points of the latent fingerprint image not covered by any triangle after the triangulation and an outmost envelope, and determining whether the minimum distance is larger than a third predefined threshold:

if yes, manually marking a control point in a third area constituted by the points and repeating the triangulation and determining whether to add a new manually marked control point in the third area until no further control point is to be added; and if no, stop manually adding any control point in the third area and all the manually marked control points are added to the set of control points.

9. The method according to claim 6, wherein the step D comprises:

D1: collecting the control points in the at least one first area according to a predefined interval;

D2: performing the triangulation for the orientation field according to all the control points in the set so as to form triangles with the control points as vertexes;

D3: traversing all triangles that are completely within the at least one first area, and obtaining centers of all the triangles that are completely within the at least one first area;

D4: obtaining estimated values of orientations of the centers respectively, and determining whether to add a new control point according to a difference between the orientation of the center and orientations of vertexes of a corresponding triangle to the center that is completely within the at least one first area; and D5: if determining to add a new control point, adding the center as a new control point to the set, and performing the triangulation for the set with the new control point added based on the steps D2-D5 until no further control point is to be added.

10. The method according to claim 9, wherein the step D2 comprises:

D21: determining an envelope of all the control points;

D22: connecting control points on the envelop to form a plurality of first type triangles with the control points on the envelop as vertexes;

D23: inserting control points within the envelop sequentially in a plurality of first type triangles to form a plurality of second type triangles; and D24: optimizing the plurality of the second type triangles.

11. The method according to claim 10, wherein the step D23 comprises:

determining part of first type triangles among the plurality of first type triangles whose circumcircles contain inserted control points;

deleting common edges between the part of first type triangles, and forming a plurality of third type triangles by connecting the inserted control points with all the vertexes of the plurality of first type triangles.

12. A device for acquiring latent fingerprint orientation, comprising:

an extracting module, configured to extract a valid area in a fingerprint image;

an acquiring module, configured to acquire an orientation field of the valid area and a confidence of each coordinate point in the valid area;

a determining module, configured to divide the orientation field of the valid area into a first area with a high confidence and a second area with a low confidence according to the confidence of each coordinate point and according to a predefined confidence threshold;

a first processing module, configured to collect control points in the first area, perform triangulation on the control points collected in the first area and determine differences between the control points to determine a set of control points;

a second processing module, configured to receive control points manually marked in the second area, add the control points marked to the set, perform a triangulation on all control points in the set and determine whether a new manually marked control point is to be added in the set according to a difference determination; and an orientation field obtaining module, configured to establish a model for control points in the set of control points to obtain an orientation field of the latent fingerprint image.

13. The device according to claim 12, wherein the acquiring module comprises:

an orientation field calculating module, configured to set the orientation field of the valid area to a matrix O(m,n) and to calculate an orientation of a coordinate point (x,y), wherein each element in the matrix O(m,n) represents an angle of a ridge orientation in the fingerprint image at a coordinate point (m,n), $$O(x, y) = \frac{1}{2}\arctan\frac{\sum_\Gamma 2G_x G_y}{\sum_\Gamma (G_x^2 - G_y^2)} + \frac{\pi}{2}$$

where $\Gamma$ represents a N×N square centered at the coordinate point (x,y), (Gx,Gy) is a gradient component of horizontal and vertical coordinates of each coordinate point in a neighboring $\Gamma$, a range of arc tan(•) is [−π, π], and a range of O(x,y) is [0°,180°]; and a confidence calculating module, configured to calculate a confidence w(x,y) of the coordinate point (x,y) according to the following formula:

$$w(x, y) = \frac{\left(\sum_\Gamma (G_x^2 - G_y^2)\right)^2 + 4\left(\sum_\Gamma G_x G_y\right)^2}{\left(\sum_\Gamma (G_x^2 + G_y^2)\right)^2}$$

wherein $\Gamma$ represents a N×N square centered at the coordinate point (x,y), (Gx,Gy) is a gradient component of horizontal and vertical coordinates of each coordinate point in a neighboring $\Gamma$, and a range of w(x,y) is [0,1].

14. The device according to claim 12, wherein the second processing module comprises:

a recording module, configured to record a manually marked control point in the second area;

a second triangulation module, configured to add the manually marked control point to the set of control points so as to perform the triangulation on all the control points in the set;

a difference obtaining module, configured to obtain a center of a triangle including a manually marked control point and to calculate a difference between an orientation of the center and an orientation of a vertex of the triangle; and a second control point adding sub-module, configured to determine whether the difference is larger than a second predefined threshold and if yes, to continue to manually mark control points in the triangle and to repeat the triangulation and to determine whether to add a new manually marked control point in the set until no further control point is to be added, and if no, no further control point will be manually marked in the triangle.

15. The device according to claim 12, further comprising:

a third control point adding module, configured to calculate a minimum distance between points of the latent fingerprint image not covered by a triangle after the triangulation and an outmost envelope, and to determine whether the minimum distance is larger than a third predefined threshold;

if yes, receiving control points manually marked in a third area constituted by the points and repeating the triangulation and determining whether to add a new manually marked control point in the third area until no newly added control point is received;

and if no, no further control point will be manually marked in the third area and all the manually marked control points are added to the set of control points.

16. The device according to claim 12, wherein the orientation field obtaining module establishes the model according to:

$$U(x, y) = \cos 2\theta(x, y) + i\sin 2\theta(x, y)$$
$$= RE(x, y) + iIM(x, y)$$

where θ(x,y) and U(x,y) and are orientation function and transform function at (x,y) respectively and RE(x,y) and IM(x,y) represent a real part and an imaginary part of U(x,y) respectively, RE(x,y) and IM(x,y) are obtained according to PR(x,y) and PI(x,y) respectively, wherein $$PR(x,y) = X^T \cdot P_1 \cdot Y$$

$$PI(x,y) = X^T \cdot P_2 \cdot Y$$

wherein, $X=(1, x, x^2, \ldots, x^M)$, $Y=(1, y, y^2, \ldots, y^M)$ and M is an order of a polynomial.

17. The device according to claim 16, wherein the model parameters are $P_1^*$ and $P_2^*$, which are obtained according to:

$$(P_1^*, P_2^*) = \arg\min_{P_1, P_2} \sum_{(x,y) \in S} \left[ \begin{array}{l} (PR(x, y, P_1) - \cos 2\theta_0(x, y))^2 + \\ (PI(x, y, P_2) - \sin 2\theta_0(x, y))^2 \end{array} \right]$$

wherein $\theta_0$ is orientation of the control point (x,y), $\theta_0 = O(x,y)$ and S is the set of control points.

18. The device according to claim 12, wherein the first processing module comprises:

a control point collecting sub-module, configured to collect the control points in the first area according to a predefined interval;

a first triangulation sub-module, configured to perform the triangulation for the orientation field according to the all control points in the set so as to form triangles with the control points as vertexes;

a center obtaining sub-module, configured to traverse all triangles that are completely within the first area, and to obtain centers of all the triangles;

a first control point adding sub-module, configured to obtain estimated values of orientations of the centers respectively, and to determine whether to add a new control point according to a difference between an orientation of the center and orientations of vertexes of a corresponding triangle to the center that is completely within the first area, and when determining a new control point is to be added, to add the center as a new control point to the set, and to perform the triangulation for the set with the new control point added until no further control point is to be added.

19. The device according to claim 18, wherein the first triangulation sub-module is configured to:
- determine an envelope of all the control points;
- connect control points on the envelope to form a plurality of first type triangles with the control points on the envelope as vertexes;
- insert control points within the envelope sequentially in the plurality of first type triangles to form a plurality of second type triangles; and
- optimize the plurality of the second type triangles.

* * * * *

UNITED STATES PATENT AND TRADEMARK OFFICE
CERTIFICATE OF CORRECTION

PATENT NO. : 8,818,056 B2  
APPLICATION NO. : 13/681001  
DATED : August 26, 2014  
INVENTOR(S) : Jie Zhou et al.

Page 1 of 1

It is certified that error appears in the above-identified patent and that said Letters Patent is hereby corrected as shown below:

In column 3, lines 65-67, delete

"$PR(x,y)=X^T \cdot P_1 \cdot y$ $PI(x,y)=X^T \cdot P_2 \cdot y$"

and replace with

--$PR(x,y)=X^T \cdot P_1 \cdot Y$ $PI(x,y)=X^T \cdot P_2 \cdot Y$--.

In column 6, lines 12-14, delete

"$PR(x,y)=X^T \cdot P_1 \cdot y$

$PI(x,y)=X^T \cdot P_2 \cdot y$"

and replace with

--$PR(x,y)=X^T \cdot P_1 \cdot Y$ $PI(x,y)=X^T \cdot P_2 \cdot Y$--.

Signed and Sealed this  
Sixteenth Day of February, 2016

Michelle K. Lee  
*Director of the United States Patent and Trademark Office*

UNITED STATES PATENT AND TRADEMARK OFFICE
CERTIFICATE OF CORRECTION

PATENT NO. : 8,818,056 B2
APPLICATION NO. : 13/681001
DATED : August 26, 2014
INVENTOR(S) : Jie Zhou et al.

It is certified that error appears in the above-identified patent and that said Letters Patent is hereby corrected as shown below:

Specification

In column 3, lines 65-67, delete

"$PR(x,y) = X^T \cdot P_1 \cdot y$ $PI(x,y) = X^T \cdot P_2 \cdot y$"

and replace with

--$PR(x,y) = X^T \cdot P_1 \cdot Y$ $PI(x,y) = X^T \cdot P_2 \cdot Y$--.

In column 6, lines 12-14, delete

"$PR(x,y) = X^T \cdot P_1 \cdot y$ $PI(x,y) = X^T \cdot P_2 \cdot y$"

and replace with

--$PR(x,y) = X^T \cdot P_1 \cdot Y$ $PI(x,y) = X^T \cdot P_2 \cdot Y$--.

This certificate supersedes the Certificate of Correction issued February 16, 2016.

Signed and Sealed this
Twenty-second Day of March, 2016

Michelle K. Lee
*Director of the United States Patent and Trademark Office*

Specification

In column 16, lines 63-65, delete

"$PR(x,y) = X^T \cdot P_1 \cdot y$ $PI(x,y) = X^T \cdot P_2 \cdot y$"

and replace with

--$PR(x,y) = X^T \cdot P_1 \cdot Y$ $PI(x,y) = X^T \cdot P_2 \cdot Y$--.